April 15, 1941. G. W. VON HOFE 2,238,436
METHOD OF AND MACHINE FOR LABELING
Filed Dec. 28, 1938 7 Sheets-Sheet 3

Fig. 3.

INVENTOR
G. W. VON HOFE
ATTORNEY

April 15, 1941.  G. W. VON HOFE  2,238,436
METHOD OF AND MACHINE FOR LABELING
Filed Dec. 28, 1938   7 Sheets-Sheet 4

*Fig. 4.*

INVENTOR
GEORGE W. VON HOFE
BY
ATTORNEY

April 15, 1941.    G. W. VON HOFE    2,238,436
METHOD OF AND MACHINE FOR LABELING
Filed Dec. 28, 1938    7 Sheets-Sheet 5

INVENTOR
GEORGE W. VON HOFE
BY
ATTORNEY

Patented Apr. 15, 1941

2,238,436

UNITED STATES PATENT OFFICE 2,238,436

METHOD OF AND MACHINE FOR LABELING

George W. von Hofe, Bound Brook, N. J., assignor to New Jersey Machine Corporation, Hoboken, N. J., a corporation of New Jersey Application December 28, 1938, Serial No. 248,049

40 Claims. (Cl. 216—55)

The invention relates to methods of and machines for labeling and has for its object to provide a novel and simple method whereby labels, and more particularly relatively stiff labels, may be efficiently and uniformly applied to the articles for which said labels are intended. The invention has for its further object to provide a novel machine for carrying out the novel method and whereby labels are adhesively and uniformly applied to articles in predetermined positions thereon. A further object of the invention comprises the provision of a labeling machine for adhesively applying labels having inherent characteristics rendering application thereof difficult to articles in an efficient and uniform manner. The invention contemplates particularly a labeling machine for efficiently connecting labels having an inherent stiffness tending to maintain and restore said labels in and to a normal flat condition, adhesively to a plurality of surfaces of said articles located in transverse relation to each other. Other more specific objects will appear from the description hereinafter and the features of novelty will be pointed out in the claims.

In the accompanying drawings which illustrate an example of the invention without defining its limits.

In its preferred form the novel method consists in moistening each label on one surface thereof, then applying a coating of adhesive to the opposite surface of said label to render the same adhesive and to further soften said label. The latter is then adhesively applied to an article and at the same time is again moistened to still further soften said label and to reduce any tendency of the applied label to detach itself from the article to a minimum. After the aforesaid adhesive application and coincidental moistening thereof, the applied label is subjected to heated pressure or pressure in the presence of heat to remove the moisture from said label and to complete the application thereof.

In order to simplify the illustration and description, the novel machine is shown in a form adapted primarily for the application of labels, as exemplified by conventional excise revenue stamps, to the tops and opposite side surfaces of bottles or similar articles, it being understood that this is in no sense intended to define the range of usefulness of the novel machine.

Figure 9:
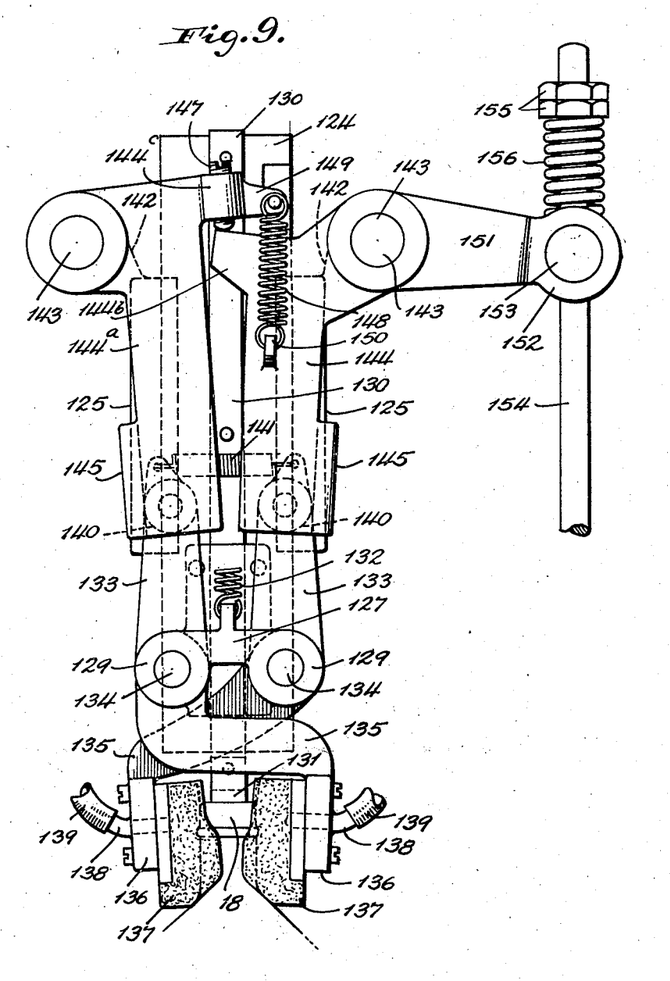
Fig. 9 is an elevation of the pressure mechanism with the parts in different positions.

The illustrated machine comprises a supporting frame 15 of appropriate type and dimensions on which a suitable container or hopper 16 is mounted in position for proper co-operation with the associated elements of the machine. The container or hopper 16 contains a supply of labels 17 in the form of an upright stack from the upper end of which successive terminal labels are removed in individual sequence for application to the articles 18 for which said labels 17 are intended. In the instant case, the labels 17 are exemplified by conventional excise revenue stamps and the articles 18 are exemplified by bottles to which said labels are adhesively applied so as to extend over the stoppers and two opposite upright surface portions of said bottles 18 as shown in Fig. 9; when fully applied, the labels 17 are thus of inverted U-shape and prevent tampering with the stoppers of said bottles 18 without damage to the labels 17 in the conventional manner. Because of the inherent stiffness of the labels 17 as exemplified by the aforesaid revenue stamps and the resultant tendency to return to a flat condition, the aforesaid application of said labels 17 in the manner indicated above, presents difficulties which are efficiently overcome in the instant machine as will be fully set forth hereinafter.

Any suitable provision may be made for periodically restoring the upper end of the stack of labels 17 to a predetermined level in proper operative relation to the associated elements of the machine. As the means for effecting the aforesaid restoration does not per se constitute a part of the novel arrangement, only a fragmentary exemplification thereof is included in the illustrated machine. With the type of mechanism for periodically elevating the stack of labels 17, the container or hopper 16 is provided with a vertically adjustable bottom on which the stack of labels 17 is supported. The aforesaid bottom of the container or hopper 16 is carried by a vertical rack which meshes with a pinion fixed upon a shaft 19 journalled on the frame 15 in any conventional manner. A ratchet wheel 20 is also secured upon the shaft 19 and may be intermittently operated by means of a pawl 21 and held against unintentional return movement by a stop-pawl 22 suitably pivoted upon the frame 15. The pawl 21 is pivotally mounted upon an operating member 23 which itself is mounted to rock upon the shaft 19 and carries a roller 24 arranged to be operatively acted upon by a cam 25 fixed upon a shaft 26 rotatably mounted on the frame 15 in any convenient manner; a spring 27 acting on the member 23 serves to maintain the roller 24 in operative relation to the cam 25. The member 23 is normally held against operation by means of a projection 28 in co-operation with a shoulder 29 formed on a controlling member 30 which is tripped to release said member 23 when the stack of labels 17 has decreased in height to a predetermined point. An arrangement of the kind described is shown in my co-pending application, Serial No. 113,796.

The stack elevating mechanism is controlled by means of a feeler 31 arranged to engage the upper end of the stack of labels 17, and vertically slidable in an upright guide 32 on the frame 15; the feeler 31 is pivotally connected at 33 with a bell-crank lever 34 fixed upon a shaft 35 journalled on the frame 15 and provided with a roller 36 arranged in operative relation to a cam 37. The latter is secured upon a rock-shaft 38 suitably mounted on the frame 15.

Figure 2:
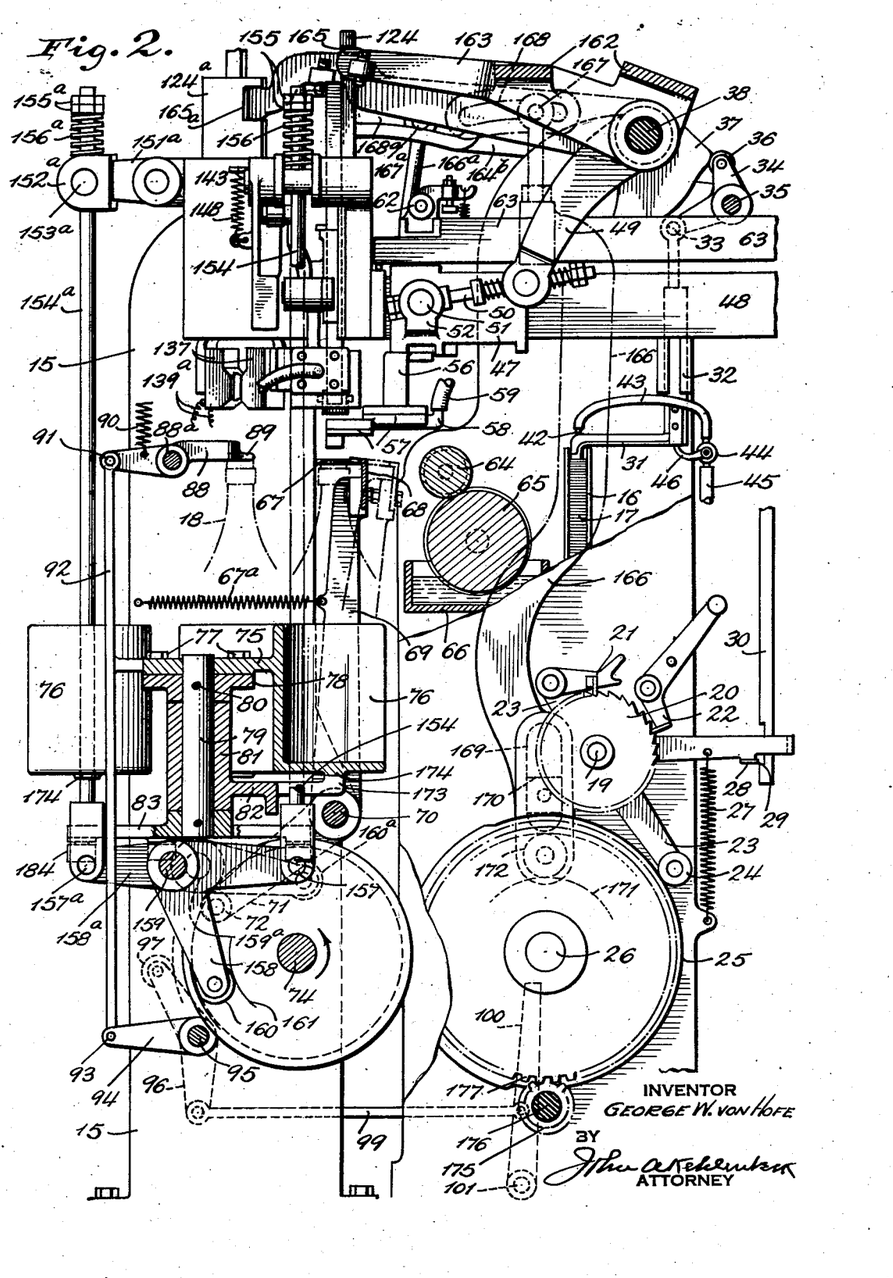
Fig. 2 is a side elevation thereof partly in section.
Figure 11:
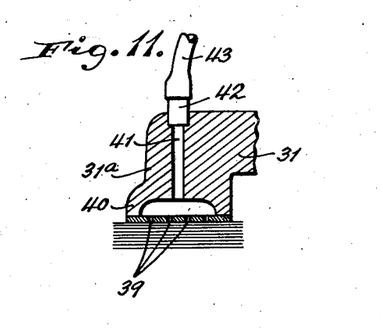
Fig. 11 is a fragmentary section showing a moistening means included in the machine.

Because of the inherent stiffness of the labels 17, as exemplified by conventional excise revenue stamps, it is desirable to soften the labels 17 in order to facilitate the application to the articles exemplified by the bottles 18. For this purpose the terminal labels 17 in the supply stack are moistened on the face thereof in any suitable manner. For instance, as shown in Fig. 11, the feeler 31 may be provided at its free end with a head 31ª having an end face provided with apertures 39 communicating with an internal chamber 40 from which a channel 41 leads to a tubular nipple 42 which projects exteriorly of the head 31ª as illustrated in Fig. 11. The nipple 42 in turn is connected preferably by means of a flexible tube 43 with one side of a valve or cock 44, the other side of which is connected for instance through the medium of a tube 45 with a source of water or other suitable fluid under pressure; the operation of the valve or cock 44 may, for instance, be controlled by a lever 46 which projects into the operative path of the feeler 31 as shown in Fig. 2, it being understood that provision is made in any suitable manner to normally maintain the valve or cock 44 in a closed position and to automatically return it thereto subsequent to each operation of the lever 46 by the feeler 31. The arrangement is such that each time the feeler 31 moves downwardly into contact with the upper end of the stack of labels 17, the lever 46 will be actuated by said feeler 31 to open the valves or cock 44 and thereby permit water or other suitable fluid to flow through the tube 43, nipple 42 and channel 41 to the chamber 40 of the feeler head 31ª; from said chamber 40 the water or other fluid issues through the apertures 39 in the form of a spray whereby the face of the current terminal label 17 in the stack is moistened. As soon as the feeler 31 develops an operative upward movement as will be more fully described hereinafter, the lever 46 will be relieved and the valve or cock 44 will automatically return to its closed position to thereby shut off the supply of water or other fluid to the spray apertures 39.

In the machine as illustrated, the means whereby individual labels 17 are successively removed from the top of the stack in the container or hopper 16, and transferred therefrom to the point of application to the articles exemplified by the bottle 18, is of the suction operated or vacuum type, and per se may be of any suitable construction. As shown, the label transferring means consists of a carriage 47 slidably mounted for reciprocation on a horizontal guide rail 48 supported on the frame 15 in any convenient manner. In the illustrated example, the means whereby the carriage 47 is reciprocated on the rail 48 comprises an arm 49 fixed upon the shaft 38 and having its free end pivotally and yieldingly connected with a coupling rod 50 which in turn is pivotally connected at 51 with a lug 52 forming part of or fixed upon the carriage 47 as shown in Fig. 2.

Figure 3:
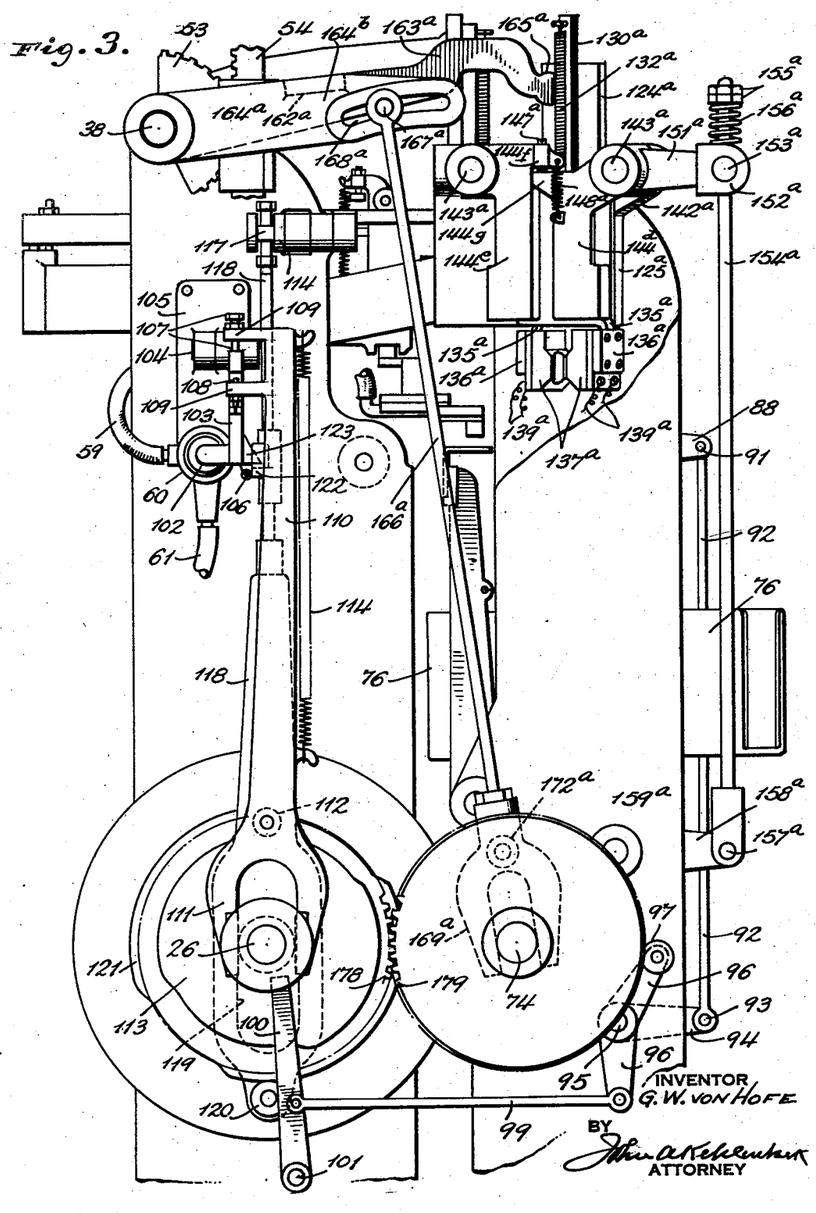
Fig. 3 is a side elevation looking in a direction opposite to Fig. 2.

The mechanism whereby the shaft 38 is rocked on its axis to correspondingly operate the arm 49 and thereby effect the reciprocation of the carriage 47 on the rail 48, may as shown in Fig. 3, comprise a toothed segment 53 fixed upon the shaft 38 and meshing with a rack 54. The latter is slidable in a guide bracket 55 suitably located upon the frame 15 and is vertically reciprocated in proper operative timing with the associated mechanism in any suitable manner, for instance, as shown in my previously mentioned co-pending application, Serial No. 113,796.

The carriage 47 supports a member 56 capable of vertical reciprocation thereon and provided at its lower end with a suction head 57 of any suitable type and having a suction nipple 58 for accommodating one end of a suction hose 59 as illustrated in Fig. 2. The suction hose 59 is connected with one side of a valve casing 60 supported upon the frame 15 in any convenient manner and having its other side connected by means of a hose or tube 61 with a source of suction such as a pump or the like; the purpose of this arrangement will appear more fully hereinafter.

The member 56 is vertically movable on the carriage 47 at one end of the reciprocation thereof to pick up a terminal label 17 from the top of the stack in the hopper 16, and at the other terminal of said reciprocation to dispose of the picked up label for application to a bottle 18 or other article. During the movement of the carriage 47 from the label pick-up station to the label disposal station the member 56 is held against downward movement on the carriage 47 by means of a roller 62 which travels along a fixed rail 63 recessed at the proper points to permit the desired downward movements of the member 56 and with it the suction head 57. Any suitable mechanism may be provided for operating the member 56 and suction head 57 in vertical directions, such as for instance disclosed in my aforesaid co-pending application, Serial No. 113,796.

In the instant machine the labels 17 picked up successively by the suction head 57 from the stack in the hopper 16 are provided with a coating of adhesive on their lower surfaces during the transfer of said labels from the pick-up station to the disposal station. This adhesive coating in addition to its other functions moistens the reverse or lower surface of each label subsequently to moistening of the face of said label by the spray from the feeler head 31ª; the softening effect of said spray is thus augmented by the softening action of the adhesive coating whereby the inherent stiffness of said labels 17, exemplified by conventional revenue stamps, is still further reduced and said labels are converted to a condition of flexibility which facilitates their application to the bottles 18 or other articles.

For the purpose of applying said coating of adhesive to successive labels 17, the machine includes adhesive applying means consisting, for instance, of an adhesive applying roll 64 suitably mounted in the machine in tangential receiving relation to a suitably mounted adhesive distributing roll 65 which dips into a supply of adhesive in a container 66 fixed in place in any convenient manner. The applying roll 64 is so located that a label 17 carried by the suction head 57 will pass in progressive tangential engagement with said roll 64 during the travel from the pick-up station to the disposal station; the arrangement is such that during a return travel of the carriage 47 the suction head 57 will be elevated and will pass over and above said applying roll 63 and accordingly will not engage the same.

The machine in its illustrated form includes supporting means located at the disposal station for receiving successive adhesive coated labels 17 from the suction head 57 and for supporting said labels 17 in predetermined applying relation to the bottles 18 or other articles. In the selected example the aforesaid supporting means includes supporting members 67 located in spaced registry at a common level for instance as shown in Fig. 2. During an operative cycle of the machine, an adhesive coated label 17 is deposited by the suction head 57 upon said supporting members 67 with the opposite end portions of said label 17 in temporary adhesive connection therewith and the intermediate portion of said label 17 extending between and spanning the space between said supporting members 67. The arrangement is such that the label 17 will be supported in predetermined label applying relation to the article to which it is to be applied, as for instance, at a level coincidental with the upper surface of the stopper whereby the bottles 18 are closed, as illustrated in Fig. 2; because of the tacky condition of the adhesive coating at this stage, the label 17 at its opposite ends will adhere to the supporting members 67 in temporary adhesive connection therewith and accordingly will be supported in predetermined applying relation to the particular bottle 18 or other article.

Figure 1:
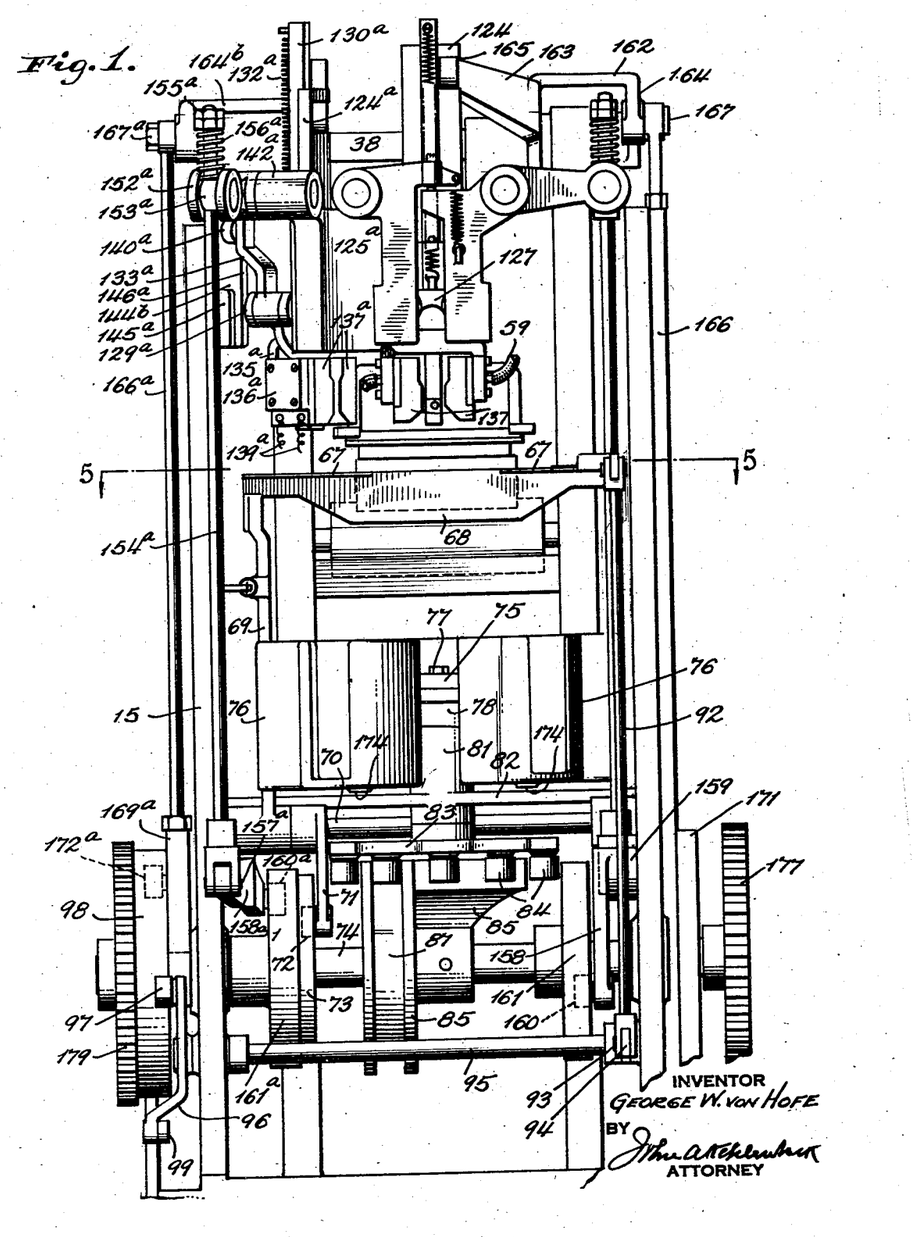
Fig. 1 is a front elevation of the novel labeling machine.

As shown in Figs. 1 and 2, the supporting members 67 comprise integral parts of or are attached to a depending web 68 which extends between and is carried by levers 69 fixed upon and projecting upwardly from a rock shaft 70 suitably journalled on the frame 15. For the purpose of adjusting the supporting members 67 from an operative label applying position to an inoperative position to permit the bottles 18 or other articles to be brought to labeling position without interference, the shaft 70 also carries an arm 71 provided at its free end with a roller 72; the latter projects into the cam groove of a cam 73 mounted upon a shaft 74 journalled in the frame 15, said cam 73 acting on the roller 72 in a manner to rock the shaft 70 and thereby adjust the supporting members 67 to and from their operative positions as will be more fully set forth hereinafter. A spring 67ᵃ may be connected with one of the levers 69 and with a pin on the frame 15 for maintaining the supporting members 67 in their normal operative position and for returning said members thereto.

In the preferred arrangement, the bottles 18 or other articles to be labeled are conveyed or advanced in intermittent steps over a given path which includes the labeling station at which the initial application of the labels takes place. For this purpose the illustrated machine is provided with a carrier movable in intermittent steps and provided with a plurality of means whereby the articles to be labeled are held in place on said carrier. In the illustrated example, the carrier comprises a turntable 75 having a plurality of upright receptacles 76 located circumferentially at regularly spaced intervals and shaped and dimensioned to accommodate the bottles 18 and to hold them in upright positions on said turntable 75 as indicated by dotted lines in Fig. 2; in the preferred arrangement, the means for holding the articles to be labeled, exemplified by the receptacles 76, will be dimensioned and shaped in accordance with the articles to be accommodated thereby. To enable different turntables with various types of holding means such as the receptacles 76 to be easily substituted in the machine, the turntable 75 is removably connected with the mechanism whereby said turntable 75 is rotatively actuated. In the form shown in the drawings, the turntable 75 is attached, for instance, by means of screws or the like 77 to a collar 78 which itself is secured to an upright shaft 79 by means of a pin 80 or its equivalent. The shaft 79 is rotatively mounted in a bearing 81 forming part of a bracket 82 suitably supported on the frame 15, said shaft 79 being held in place in the bearing 81 by the collar 78 which rests upon the upper end thereof as shown in Fig. 2. The shaft 79 projects downwardly beyond the bearing 81 and carries a member 83 which preferably bears against the lower end of the bearing 81 to assist in holding the shaft 79 in place, and is provided with a plurality of rollers 84 depending therefrom at spaced intervals as illustrated in Fig. 1. The rollers 84 are arranged for co-operation with a cam 85 secured upon the shaft 74 and provided with a groove consisting of a helical section 86 having an open entering end and a continuing circular section 87 concentric to the axis of the shaft 74 in the direction of rotation thereof and terminating in an open exit end as shown in Fig. 5.

Figure 5:
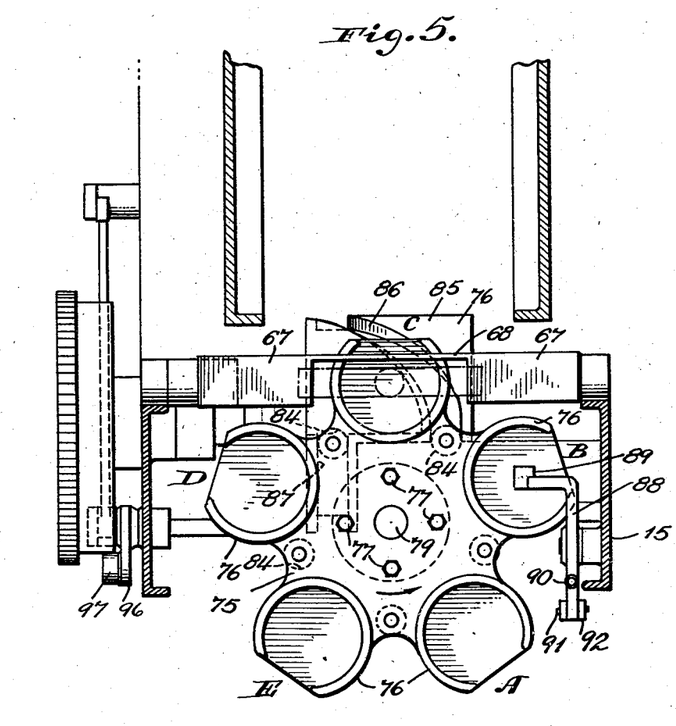
Fig. 5 is a horizontal section on the line 5—5 of Fig. 1.

In the example of the machine selected for purposes of illustration and description, the carrier or turntable 75 is provided with five receptacles 76 located at equally spaced intervals circumferentially of the turntable 75 as shown in Fig. 5. In the operation of the machine, the turntable 75 is intermittently rotated in successive steps whereby the receptacles 76 are progressively brought to successive stations at which successive steps in the operative cycle are performed; it will be understood that each intermittent advance of the turntable 75 is followed by a period of rest of sufficient time duration to enable the various operative steps to be carried out. For instance, in the instant installation, a bottle 18 is placed in a receptacle 76 at the feeding station A in Fig. 5 and is then advanced to the index station B; from the latter the bottle 18 is carried to the first label applying station C and from there to the second label applying station D, after which the labeled bottle 18 passes to the removal station E.

For the purpose of determining the presence of a bottle 18 in a receptacle 76 and controlling the operation of the mechanism accordingly, the machine includes an indexing means which is operatively effective at the index station B. In the form illustrated in the drawings, this indexing means includes an index lever 88 provided at its one end with an index member 89 for instance as shown in Fig. 5. The lever 88 is arranged to be pivotally rocked and for this purpose is pivoted at 88ᵃ on the frame 15 and is influenced in one direction by a spring 90 as illustrated in Fig. 2. The opposite end of the lever 88 is pivotally connected at 91 with one end of a link 92, which at its other end is pivotally attached at 93 to an arm 94 fixed upon a shaft 95 suitably journalled on the frame 15. The shaft 95 further carries a bell-crank lever 96 one arm of which is provided with a roller 97 normally acted on by a suitable cam 98 fixed upon the shaft 74; the other arm of the lever 96 is connected by means of a link 99 with a control-member 100 which is pivoted at 101 on the frame 15 and extends upwardly from said pivot 101 as shown in Figs. 2 and 3. If at any time during the operation of the machine, the turntable 75 fails to bring a bottle 18 to the index station B for instance because the attendant neglected to place a bottle 18 in one of the receptacles 76 at the feeding station A, the indexing means will function to control certain operative steps accordingly as will appear more fully hereinafter.

The previously mentioned valve casing 60, in addition to its connections with the suction hose 59 and the tube 61, is provided with an opening and a co-operating valve 102 whereby communication between the valve casing 60 and the atmosphere is controlled, the arrangement being such that no suction will be developed in the suction head 57 when the valve 102 is in its open position. The valve 102 is carried by one arm of a bell-crank lever 103 pivoted at 104 upon a bracket 105 fixed upon the frame 15, a suitable spring 106 serving to urge said valve 102 to its open position. The other arm of the bell-crank lever 103 extends between two adjustable projections, shown in the form of screws 107 and 108, carried by spaced lugs 109 forming part of or secured upon a tripping member 110. The latter is suitably guided in vertical directions, and is formed with a lower forked end 111 which straddles the shaft 26 as shown in Fig. 3. The tripping member 110 further carries a roller 112 in rolling engagement with a suitable cam 113 fixed on the shaft 26; a spring 114 acts on the tripping member 110 in a manner to maintain the roller 112 in operative contact with the cam 113. As illustrated in Fig. 3 the upper end of the control-member 100 is normally located at a point between the depending legs of the forked end 111 of the tripping member 110; under the influence of the indexing means, the control-member 100 is arranged to be pivotally operated to bring its upper end into the downward path of one leg of the forked end 111 to thereby prevent downward operation of the tripping member 110 when no bottle 18 is present at the indexing station B, as will be more fully set forth hereinafter.

Figure 4:
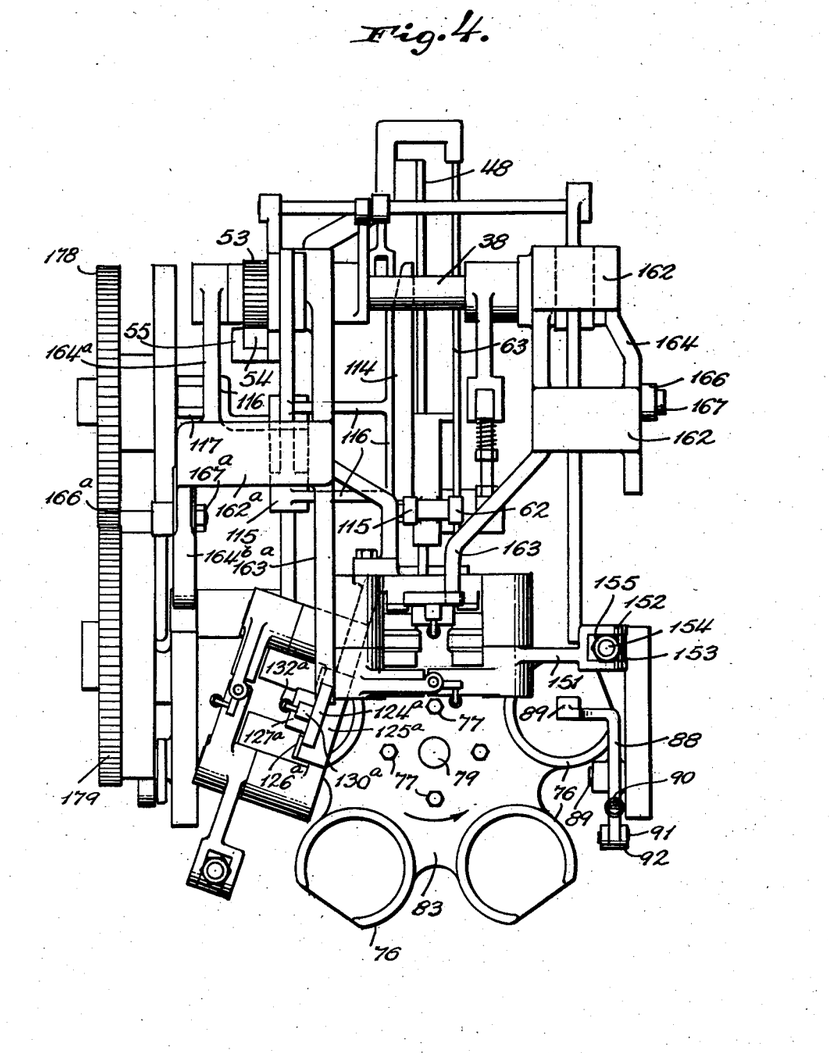
Fig. 4 is a plan view.

The vertical movements of the suction head 57 relatively to the carriage 47 to pick up successive terminal labels 17 from the supply stack and to dispose of the picked up labels for application to the bottles 18, or other articles, may be controlled by means of a movable rail 114 associated with the fixed rail 63, and a second roller 115 similar to the roller 62 in the same way as shown and described in my co-pending application, Serial No. 113,796. The aforesaid movable rail is operatively controlled also as set forth in said co-pending application, and similarly includes a lever or bracket 116 which carries said movable rail 114 as shown in Fig. 4, and is pivoted at 115 on the frame 15. The lever or bracket 116 is pivotally connected at 117 with an operating member 118 slotted at 119 for the accommodation of the shaft 26 and provided at its lower end with a roller 120 in rolling engagement with a suitable cam 121 fixed upon the shaft 26. The previously mentioned spring 114, in addition to its other functions, acts on the member 118 in a manner to maintain the roller 120 in contact with the cam 121; as shown in Fig. 3 the spring 114 is connected at one end to the tripping member 118 and at its other end to the operating member 118.

For the purpose of controlling the vertical operation of the suction head 57 in dependence upon the proper picking up of a label 17 thereby, the operating member 118 is provided with a projection 122 arranged to co-operate, under certain conditions, with an associated projection 123 located on the bell-crank lever 103 in a manner to prevent vertical movement of the operating member 118 in the same way and for the same purposes as set forth in my co-pending application, Serial No. 113,796.

Figures 6, 7, 8:
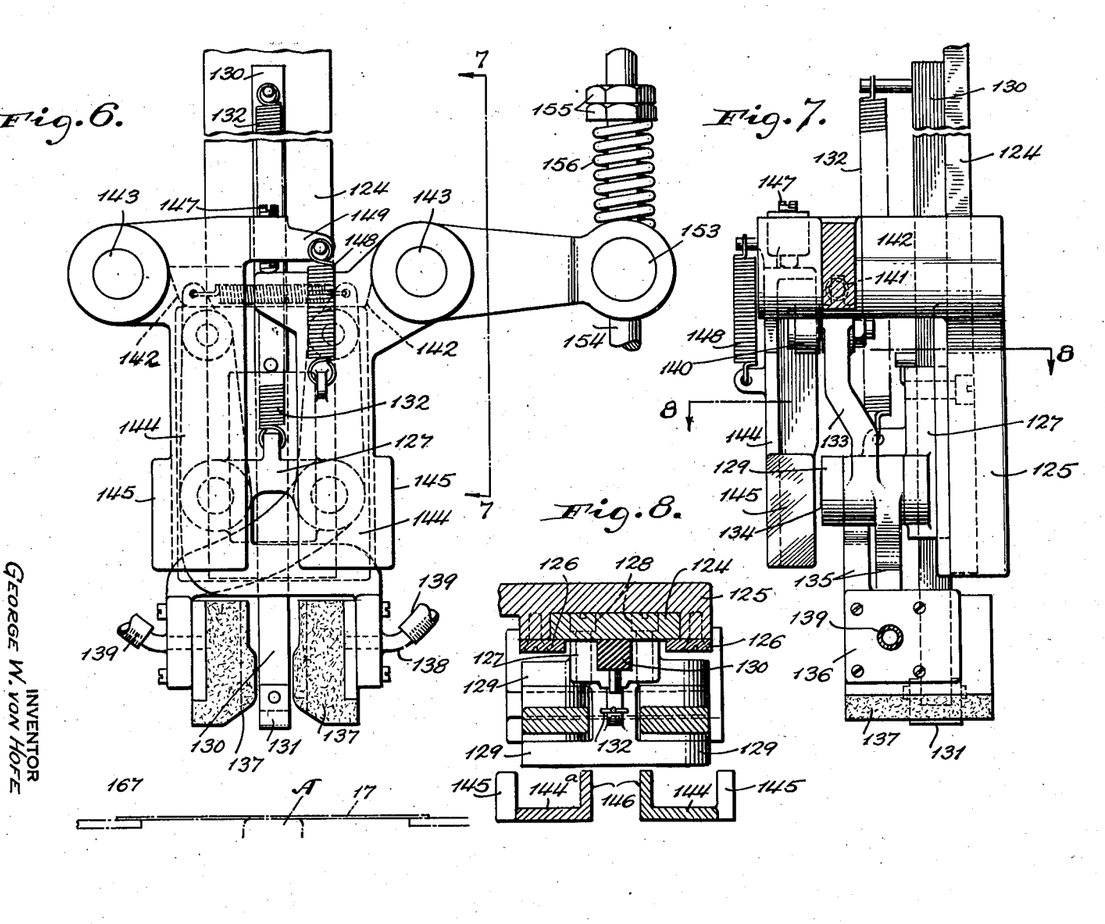
Fig. 6 is an elevation of a pressure mechanism whereby the labels are adhesively connected with the articles.
Fig. 7 is a sectional elevation on the line 7—7 of Fig. 6.
Fig. 8 is a horizontal section on the line 8—8 of Fig. 7.
Figure 10:
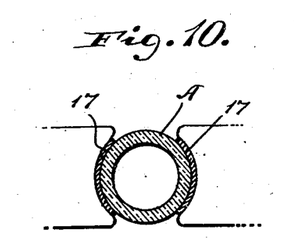
Fig. 10 is a fragmentary plan view illustrating an operative step of the pressure mechanism.

In addition to the parts so far described, the machine includes a first applying means for effecting the initial application of a label 17 to a bottle 18 or other article, and located at the first applying station C. As shown, this applying means comprises a slide-member 124 slidably mounted in a vertical guideway 125 fixed upon the frame 15 in any convenient manner, and including preferably removable side members 126 whereby the slide-member 124 is slidably maintained in the guideway 125. The slide-member 124 carries a guide bracket 127 which preferably is removably fixed in place by screws 128 and includes bearings 129. A pressure slide 130 carrying a suitable pressure device 131 at its lower end is slidably mounted in said guide bracket 127 in surface engagement with the slide-member 124 and slidable relatively thereto as will appear more fully hereinafter. A spring 132 has its one end connected with the guide bracket 127 and its other end attached to the pressure slide 130 and causes the pressure device 131 to develop an operative pressure on the label 17 in the application thereof to the bottle 18 or other article, as will be more clearly described hereinafter. In addition to the above, the applying means includes pressure levers 133 pivotally mounted at 134 in the bearings 129 and continued in the form of oppositely directed arms 135 which intersect each other as shown in Figs. 6 and 9 and terminate in depending ends 136 to which pressure pads 137 of suitable material, preferably yielding in character are secured in any convenient manner. The ends 136 are preferably constructed in a manner to supply fluid to the pressure pads 137 to render the same moist, and, as shown, are provided with interior channels and communicating nipples 138 for the accommodation of tubes 139 connected with a suitable source of moistening fluid. In the preferred arrangement, the pressure pads 137 in addition to being yielding in character may be shaped at least at their active surfaces to fit the surface of the bottles 18 or other articles to which the labels 17 are to be applied, or the opposed surfaces of the depending ends 136 are so shaped in which case the pressure pads 137 may be of sheet form as shown in Fig. 10.

In any case the pressure levers 133 may be provided at their upper ends with rollers 140 and preferably are connected at said upper ends by a spring 141 tending to force the pressure pads 137 toward each other.

The guideway 125, as shown in Figs. 6, 7 and 9, includes bearing lugs 142 in which pivot pins 143 are journalled, said pivot pins 143 carrying operating levers 144 and 144ᵃ which control the operation of the pressure levers 133 and the pressure pads 137 thereof. The operating levers 144 and 144ᵃ throughout a portion of their length are provided with outer side flanges 145 extending for a predetermined distance from their lower ends, and with opposed inner side flanges 146 which extend in parallel spaced relation to the outer side flanges 145 and upwardly beyond the same to provide surfaces along which the rollers 140 of the pressure levers 133 travel, in the operation of the mechanism as will be described more fully hereinafter. With this construction, the operating levers 144 and 144ᵃ at their lower end portions are channelled in cross-section as shown in Fig. 8 for the accommodation of the aforesaid rollers 140 to thereby operatively connect the pressure levers 133 with the operating levers 144 and 144ᵃ respectively at a given period in the operative cycle of the machine, as will be more particularly set forth further on in the description.

The operating levers 144 and 144ᵃ are coupled together for coincidental operation in the intended manner in any suitable way. For instance, as shown in Figs. 6 and 9, said levers 144 and 144ᵃ are provided respectively with lugs 144ᵇ and 144ᶜ which project laterally from said levers in directions toward each other, and in superimposed overlapping registry with each other. In the preferred arrangement one of said lugs 144ᵇ or 144ᶜ carries an adjustable projection adapted to engage the other lug; in the illustrated construction, the adjustable projection is exemplified by a screw 147 threaded in the lug 144ᶜ and bearing against the lug 144ᵇ as shown in Figs. 6 and 9. A spring 148 having its one end connected with an extension 149 of the lug 144ᶜ and its other end attached to an ear 150 on the operating member 144 serves to yieldingly maintain said screw 147 or its equivalent in bearing contact with the lug 144ᵇ.

Any suitable mechanism may be provided for actuating the levers 144 and 144ᵃ and their associated elements in operative synchronism with the other parts of the machine. For instance, as shown in the selected example, the operating member 144 may constitute an integral part of or be connected with an arm 151 having a forked free end 152 in which a bearing pin 153 is pivotally mounted. A connecting rod 154 is slidably mounted in said bearing pin 153 and is threaded at its upper end for the accommodation of nuts 155, against one of which one end of a spring 156 bears; the other end of said spring 156 engages the bearing pin 153 to thereby provide a resilient connection between said arm 151 and connecting rod 154. The lower end of the latter is pivotally connected at 157 with one arm of a bell-crank lever 158 pivoted at 159 on the frame 15 and having its other arm provided with a roller 160 projecting into the cam groove of a cam 161 secured upon the shaft 74.

In the operation of the machine, the slide member 124 is slidably shifted in the guideway 125 to correspondingly actuate the pressure slide 130 and pressure levers 133 in synchronised operative steps by means of suitable mechanism. The latter in its illustrated form includes a bracket 162 loosely mounted on the shaft 38 and having spaced arms 163 and 164, the former of which has its free end preferably rounded and located in a recess 165 formed in the slide member 124 for instance near its upper end. An actuating member 166 is pivotally connected at 167 with the other arm 164 of the bracket 162, said arm 164 preferably being provided with a slot 168 in which the pivot 167 is adjustably mounted to enable the operative rocking movements of the bracket 162 to be selectively adjusted. The actuating member 166 is formed near its lower end with a slot 169 for the accommodation of a bearing block 170 pivotally fixed on the frame 15 and serving to guide the member 166 in its operative movements. A suitable cam 171 is secured on the shaft 26 and in co-operation with a roller 172 carried by the member 166 serves to operate the latter and its associated elements.

The machine furthermore includes additional applying means operating subsequently to the first applying means at the applying station C, and operative for instance at the second label applying station D. As shown in the drawings, the aforesaid additional applying means may correspond in construction and operation substantially to the first applying means located at the first applying station C, and accordingly may include a slide member 124ᵃ slidably mounted in a vertical guideway 125ᵃ fixed upon the frame 15 in any convenient manner; as illustrated in Fig. 4, the slide member 124ᵃ may be slidably maintained in the guideway 125ᵃ by means of removable side members 126ᵃ corresponding to the side members 126 of the first applying means.

The slide member 124ᵃ carries a guide bracket 127ᵃ similar to the guide bracket 127 and likewise serving to maintain a pressure slide 130ᵃ corresponding to the pressure slide 130 in slidable surface engagement with the slide member 124ᵃ; the pressure slide 130ᵃ is influenced by a spring 132ᵃ similar to the spring 132 for the same purpose and in the same manner as in the first applying means. The pressure slide 130ᵃ at its lower end carries a pressure device corresponding to the previously described pressure device 131 and functioning in a similar manner.

The guide bracket 125ᵃ includes bearings 129ᵃ in which pressure levers 133ᵃ are pivotally mounted, said levers 133ᵃ, like the equivalent levers 133 of the first applying means, being continued in the form of oppositely directed arms 135ᵃ which intersect each other and terminate in depending ends 136ᵃ to which pressure pads 137ᵃ similar to the previously mentioned pressure pads 137 are secured in any suitable manner. As in the first applying means the pressure levers 133ᵃ are provided at their upper end with rollers 140ᵃ and likewise are preferably connected at said upper ends by a spring similar to the spring 140 and in the same manner tending to force the pressure pads 137ᵃ toward each other. In the second applying means now being described suitable provision is preferably made in any convenient manner for heating the pressure pads 137ᵃ for the purpose to be more fully described hereinafter; in the selected example, the heating means is diagrammatically illustrated as an electrical device connected with a source of electricity by means of the wires 138ᵃ.

As in the first applying means, the guideway 125ª includes bearing lugs 142ª in which operating levers 144ᵈ and 144ᵉ are pivotally mounted by means of pivot pins 143ª for controlling the operation of the pressure levers 133ª and the pressure pads 137ª carried thereby. Throughout a portion of their length, the operating levers 144ᵈ and 144ᵉ are provided with outer side flanges 145ª similar to the flanges 145 and likewise extending for a predetermined distance from the lower ends of said levers 144ᵈ and 144ᵉ; the latter are further provided with opposed inner side flanges 146ª extending in spaced parallel relation to the inner side flanges 145ª and upwardly beyond the same to provide surfaces traversed by the rollers 140ª in the operation of the mechanism as will appear more fully hereinafter. With this arrangement, the operating levers 144ᵈ and 144ᵉ are channelled in cross-section at their lower ends in the same way and for the same purpose as the operating levers 144 and 144ª of the first applying means. As in this last named means the operating levers 144ᵈ and 144ᵉ are operatively coupled together for instance through the medium of an adjustable projection or screw 147ª mounted in a lug 144ᶠ of the lever 144ᵉ and bearing against a lug 144ᵍ of the lever 144ᵈ as shown in Fig. 3. A spring 148ª corresponding to the spring 148 of the first applying means serves to yieldingly maintain the projection or screw 147ª in bearing contact with the lug 144ᵍ.

The operating levers 144ᵈ and 144ᵉ may be actuated in operative synchronism with the other elements of the machine by any suitable mechanism as for instance in a manner similar to that shown and described in connection with the first applying means. In the selected example, the operating member 144ᵈ constitutes an integral part of an arm 151ª having a forked free end 152ª in which a bearing pin 153ª is pivotally mounted. A connecting rod 154ª, similar to the rod 154, is slidably mounted in the bearing pin 153ª and is yieldingly connected therewith by means of a spring 156ª and nuts 155ª threaded upon said rod 154ª, as shown in Figs. 1, 2 and 3. The lower end of the connecting rod 154ª is pivotally attached at 157ª with one end of a rocking lever 158ª pivoted at 159ª on the frame 15 and provided at its other end with a roller 160ª co-operating with a suitable cam 161ª fixed on the shaft 74, as shown in Fig. 1.

During an operative cycle of the machine, the slide member 124ª is slidably shifted in the guideway 125ª to correspondingly actuate the pressure slide 130ª and pressure levers 133ª in properly timed relation to the other parts of the machine, by any suitable actuating mechanism which, as shown, may be similar to that of the first applying means. In its illustrated form the last named actuating mechanism accordingly comprises a bracket 162ª loosely mounted on the shaft 38 and including spaced arms 163ª and 164ª, the former of which has its free end preferably rounded and located in a recess 165ª formed in the slide member 124ª for instance near its upper end. The bracket 162ª further includes a member 164ᵇ preferably provided with a slot 168ª in which a pivot pin 167ª is adjustably mounted for pivotally and adjustably connecting one end of an actuating member 166ª with the bracket 162ª and through the latter with the arms 163ª and 164ª. The lower end of the actuating member 166ª is forked at 169ª to slidably straddle the shaft 74 and carries a roller 172ª projecting into a cam groove formed in the previously mentioned cam 98 fixed on the shaft 74.

For the purpose of supporting the turntable 75 and more particularly the receptacles 76 thereof from below at the respective applying stations C and D during the steps of applying labels 17 to the bottles 18 or other articles, the bracket 82 is provided with supporting devices which project beneath and provide rests for the receptacles 76 located at the stations C and D respectively at any given time. In the illustrated example, the supporting devices are shown in the form of rigid arms 173 extending radially outward from the bearing 81 and located so as to extend beneath two receptacles 76 each time the latter arrive at the stations C and D. The arrangement is such that said receptacles 76 rest upon said arms 173 at said stations C and D as shown in Fig. 2; to facilitate the supporting action of the arm 173, the receptacles 76 may be provided on the bottoms thereof with bosses 174 adapted to engage said arms 173 as illustrated in Fig. 2. From the above it will be clear, as the steps of applying the labels 17 to the bottles 18 or other articles take place at the stations C and D, that operative forces such as downward pressures exerted on said bottles 18 or other articles by the label applying mechanism, will be resisted by the arms 173 or their equivalent.

The machine may be operatively driven in any convenient manner, as for instance by means of a pinion 175 fixed upon a suitably mounted driving shaft 176 actuated in any conventional manner, said pinion being in mesh with a gear 177 secured on the shaft 26. The latter also carries a gear 178 which meshes with a co-operating gear 179 fastened upon the shaft 74, said gears 178 and 179 serving to transmit power from the shaft 26 to the shaft 74 to operate the elements associated therewith.

In describing the operation of the novel machine, it will be assumed that labels 17 exemplified by conventional excise revenue stamps are being applied to the tops and necks of bottles 18, it being understood that this is done for convenience and with no intent to thereby define or limit the range of utility of said machine.

With the parts in the position shown in Fig. 2, the feeler head 31ª is in contact with the current terminal label 17 at the top of the supply stack, and the upper surface of said terminal label 17 is being moistened by the spray of fluid which issues through the apertures 39; it will be understood that the valve lever 46 is actuated at this stage by the feeler 31 to open the valve 44 whereby the aforesaid spray is controlled. By the action of the cam 37 on the roller 36 and bell-crank lever 34, the feeler 31 is moved up and down in predetermined timing with the other steps in the operative cycle of the machine, and at the proper moment is elevated in the guide 32 to move the feeler head 31ª upwardly away from the supply stack of labels 17. As this upward movement takes place, pressure on the valve lever 46 is relieved and the valve 44 accordingly is closed to shut off the supply of fluid to the chamber 40 and thereby discontinue the spray through the apertures 39.

In proper operative synchronism with the above steps the suction head 57 is lifted on the carriage 47 to a level above the adhesive applying roll 64 or in other words, to a point above the intermediate position of said suction head 57 illustrated in Fig. 2; in this figure it may be assumed that the suction head 57 is being raised subsequent to the deposit thereby of a label 17 on the supporting members 67 in position for application to a bottle 18 or other article. When the suction head 57 has been raised to the proper extent, the carriage 47 will be shifted to the right on the rail 48 in Fig. 2 to bring the elevated suction head 57 to the pick-up station in vertical registry with the supply stack of labels 17 in the hopper or container 16; from the description hereinbefore, it will be clear that the feeler 31 occupies a raised position at this time and accordingly does not interfere with the positioning and operation of the suction head 57 at said pick-up station.

By properly timed downward operation of the member 56 on the carriage 47, the suction head 57 is correspondingly moved downwardly into surface contact with the current terminal label 17 at the top of the supply stack, which terminal label 17 has previously received an initial moistening by the spray from the feeler head 31ª. As this surface engagement takes place, suction is automatically developed in the suction head 57 because of the closure of the valve 102 under the operative control of the tripping member 110 and associated elements, and the suction head 57 is raised on the carriage 47 to thereby pick up or remove said terminal label 17 from the supply stack. The terminal label 17 thus picked up is raised to a level corresponding to that of the adhesive applying roll 64, and the carriage 47 is moved toward the left in Fig. 2 on the rail 48; the label 17 carried by the suction head 57 is thereby moved in progressive tangential contact with the adhesive applying roll 64 and receives a coating therefrom, which in addition to rendering the label 17 adhesive moistens the lower surface thereof. The movement of the carriage 47 is continued until the suction head 57 with the label 17 thereon is in vertical registry with the supporting members 67 at the label applying station of the machine.

In the meantime, a capped bottle A has been placed in upright position in a receptacle 76 at the feeding station A by an attendant, it being understood that the turntable 75 or equivalent carrier is at rest at the time. At the proper moment the cam 85 which is being rotated at the time will cause the entering end of the helical section 86 of said cam 85 to engage one of the rollers 84 and at the same time to cause a companion roller 84 and the circular section 87 to become disengaged as will be apparent from an inspection of Fig. 5. As the cam 85 rotates, the helical section 86 thereof will move the one roller 84 in a circular path to the left in Figs. 4 and 5 and thereby will correspondingly rotate the turntable 75 or equivalent carrier on its axis. As soon as the given roller 84 passes from the helical section 86 of the cam 85 into the circular section 87 thereof, the turntable 75 or equivalent carrier will come to rest and remain so as long as the aforesaid given roller 84 is in said circular section 87 of the cam 85.

The aforesaid rotative movement of the turntable 75 is such as to shift the capped bottle A to the index station B in which the upper end of said bottle A is located beneath and in registry with the index member 89 of the index lever 88. The latter is held in position above the capped end of the bottle A against the tension of the spring 90 until a recess in the rotating cam 98 comes into registry with the roller 97 carried by the bell-crank lever 96. As this stage resistance developed by the roller 97 riding on the cam 98 is removed whereupon the spring 90 will swing the index member 89 into engagement with the capped end of the bottle A and the tripping member 110 will be operated by the action of the cam 113 and the spring 114 in a downward direction. This will cause the upper projection 107 to act on the bell-crank lever 103 in a manner to close the valve 102 whereupon suction will be developed in the suction head 57. In proper operative sequence the latter will, as described above, pick up a terminal label 17 from the supply stack, convey said label 17 in contact with the adhesive applying roller 64 to receive a coating of adhesive therefrom and deposit said adhesive coated label 17 on the supporting members 67 which have been moved into operative position by the action of the cam 73 on the roller 72, arm 71 and levers 69.

In the meantime, while the supporting members 67 and associated parts occupy inoperative positions out of the way, the turntable 75 has been rotated another step by the co-operative action of the helical section 86 of the cam 85 on one of the rollers 84 to shift the bottle A from the index station B to the first label applying station C. After the adhesive coated label 17 has been deposited upon the supporting members 67 in the operative position of the latter, said label 17 with its ends in temporary adhesive connection with said members 67 spans the space between the latter and is supported by said members 67 above and in label applying relation to the upright bottle A. In the illustrated example, the arrangement is such that at this stage the capped end of said bottle A is beneath and in registry with approximately the middle section of said label 17 so that the latter is supported in symmetrical applying relation to said capped end of said bottle A.

Because of the fact that the particular roller 84 rides in the concentric circular section 87 of the cam 85, the turntable 75 will remain at rest for a sufficient time period to permit the first label applying means at the applying station C to perform its functions as follows: Through the cooperation of the rotating cam 171 and the roller 172 a downward pull will be developed on actuating member 166 and transmitted to the arm 164 of the bracket 162 whereby the latter is pivotally swung on the shaft 38 to correspondingly swing the arm 163 of said bracket 162 in a downward direction. The free end of the arm 163 will transmit this movement to the slide member 124 and cause the latter to move downwardly in the vertical guideway 125 and carry with it the guide bracket 127 and pressure levers 133 which are positioned relatively to each other as illustrated in Fig. 6 during these operative steps; at the same time the pressure slide 130 also moves downwardly with the slide member 124 and finally brings the pressure device 131 into engagement with the intermediate portion of the label 17 which previously has been deposited upon the carrying members 67. As the aforesaid downward movements continue, the pressure device 131 will force the intermediate portion of said label 17 downwardly into contact with the capped end of the bottle A, whereupon the downward movement of the pressure device 131 and the pressure slide 130 will be arrested by said contact with the capped end of the bottle A as shown in Fig. 9; the slide-member 124 will however continue to move downwardly independently of and relatively to the pressure slide 130, and the spring 132 will thereby be stretched under tension which is transmitted to the pressure slide 130 and pressure device 131 and causes the latter to firmly press the intermediate portion of said label 17 into adhesive engagement with the capped end of the bottle A.

During the concurrent downward movements of the slide member 124 and pressure slide 130, the rollers 140 of the pressure levers 133 travel downwardly along the inner side flanges 146 and as the slide member 124 continues its independent downward movement, said rollers 140 will finally be located in the channelled lower ends of the operating levers 144 and 144ᵃ between the outer side flanges 145 and the inner side flanges 146 thereof as illustrated in Fig. 9; the pressure levers 133 are accordingly operatively connected with or coupled to the operating levers 144 and 144ᵃ as this point in the operative cycle is reached. As the pressure members 133 travel downwardly, the outer end portions of the label 17 will be engaged and withdrawn thereby from the supporting members 67 and will be bent or folded downwardly upon opposite sides of the neck of the bottle A; at this stage the pressure pads 137 are correspondingly located upon said opposite sides of the bottle neck.

In proper operative synchronism with the other mechanism at this stage, a downward pull is exerted on the connecting rod 154 by the action of the rotating cam groove 161 on the roller 160 and the bell-crank lever 158, which is transmitted to the arm 151 and pivotally swings the latter on the one pivot pin 143. The operating lever 144 is correspondingly swung on said pivot pin 143 and through the medium of the lugs 144ᵇ and 144ᶜ and the screw 147 coincidentally swings the operating lever 144ᵃ on the other pivot pin 143. As these pivotal movements of the levers 144 and 144ᵃ take place, the lower channelled ends thereof are moved toward each other and by acting on the rollers 140 through the medium of the outer side flanges 145, pivotally actuate the pressure levers 133 on the pivots 134 in directions to shift the pressure pads 127 toward each other. The downwardly bent or folded outer end portions of the label 17 are thereby brought into engagement with the neck of the bottle A upon opposite sides thereof and as the operative action continues are passed into adhesive engagement therewith by said pressure pads 137 as shown in Fig. 9.

It will be noted that the latter are moistened so that the label 17, which previously has been moistened at the pick-up station and by the coating of adhesive applied by the roller 64 is again moistened by said pressure pads 137; the latter moistening by the pressure pads 137 takes place coincidentally with the application of the end portions of the label 17 to the bottle neck. The stiffness normally inherent in said label 17 is thereby still further reduced so that said label is readily manipulated in the indicated manner and at the same time developes no tendency to spring away from the bottle neck at this time.

When the pressure pads 137 have performed their applying functions as set forth, the mechanism is actuated to swing the arm 151 upwardly and to thereby pivotally operate the operating levers 146 and 144ᵃ, and consequently the pressure levers 133 in reverse direction and to move the pressure pads 137 apart and away from the neck of the bottle A. At the proper time the slide member 124 is moved upwardly in the guideway 125 by the arm 163 of the bracket 162 which is pivotally swung on the shaft 38 through the medium of the actuating member 166, its roller 172, and the cam 171 to restore the parts to the position illustrated in Fig. 6.

By this time the particular roller 84 of the turntable 75 has moved out of the circular section 87 of the cam 85 and a successive roller 84 is ready to enter the helical section 86 of said cam 85. As the latter continues its rotation, the turntable 75 is again rotatably operated to shift the initially labeled bottle A from the first applying station C to the second applying station D. At the latter station, the mechanical elements comprising the additional applying means are operated under the control of the actuating member 166ᶜ, its roller 172ᵃ and the cam groove formed in the cam 98 on the shaft 74 to vertically actuate the slide member 124ᵃ and its associated elements, and under the control of the connecting rod 154ᵃ, rocking lever 158ᵃ, its roller 160ᵃ and cam 161ᵃ on the shaft 74 to actuate the pressure pads 137ᵃ, in substantially the same way as the elements of the first applying means are operated at the first applying station C.

In any case, at the proper point in the operative cycle of the machine, the pressure device carried by the pressure slide 130ᵃ is brought into engagement with that part of the label 17 on the capped end of the bottle A, and is caused to exert a pressure thereon whereby the application of this part of said label 17 is completed and the label as a whole is held against shifting on the bottle A. In proper operative synchronism with the other operative steps, the pressure pads 137ᵃ are operated to develop applying pressure to the end portions of said label 17 which have previously been initially applied to opposite sides of the neck of said bottle A. As the pressure pads 137ᵃ are heated, they subject the applied portions of said label 17 to the action of heat and thereby not only quickly remove the previously applied moisture therefrom, but at the same time set the adhesive coating of said label 17; as a result, the application of said label 17 to the particular bottle A is completed and said label is securely fastened thereto against any normal tendency to spring away from said bottle.

When the operations of the additional applying means has been completed, the turntable 75 will again be rotated to transfer the finally labeled bottle A from the second applying station D to the removal station E for suitable disposal by an attendant or by means of automatically co-operating means.

It will be understood that as the turntable 75 is operated, successive bottles A or other articles will be carried thereby to the various stations in consecutive relation so that the operative steps at the several stations may be concurrently carried out at said stations on a plurality of bottles A or their equivalent. The machine is thus not only continuous in operation but also very rapid in turning out fully labelled articles.

If at any time during an operative period of the machine no bottle A is in place on the turntable 75 at the index station B, the index lever 88 at the moment the recess of the cam 98 registers with the roller 87, will be swung on its pivot 88ᵃ by the action of the spring 90 to exert an upward pull on the link 92. The latter will thereby correspondingly move the arm 94 to rock the shaft 95 and shift the roller 97 into said recess of the cam 98.

As the shaft 95 is thus rocked on its axis, the bell-crank lever 98 will exert a pull to the left in Fig. 2, or to the right in Fig. 3, whereby a pull in the same direction is exerted on the link 99 and the control-member 100 is swung on its pivot 101 to shift the upper end of said member 100 beneath and into registry with the one leg of the forked end 111 of the tripping member 110. The latter is thereby held against downward movement and the upper projection 107 is prevented from acting on the bell-crank lever 103 to close the valve 102. As a result of this, no suction will be developed in the suction head 57 which at this stage is being operated to transfer a label 17 from the supply stack to the label depositing station, and accordingly no label 17 is removed from said stack. If a bottle A is present in the next successive receptacle 76 of the turntable 75, the aforesaid condition will be corrected and the normal operations of the machine will be resumed.

When the machine is in operation, the suction in the suction head 57 will be automatically controlled in properly timed relation to the operative functions of said suction head 57, by the tripping member 110 and its projections 107 and 108 in co-operation with the valve 102, as set forth in my prior application previously mentioned herein. If the suction head 57 for some reason fails to pick up a terminal label 17 from the supply stack, or a label 17 is not correctly positioned on said suction head 57, the openings of the latter will remain either wholly or partly uncovered, with the result that it becomes impossible to develop efficient suction in said suction head 57. In such case, the mechanism will be automatically controlled to meet this condition as also described in my aforesaid prior application.

The instant machine operates with maximum efficiency in the application of labels to the articles for which they are intended, and is particularly effective in applying labels which are inherently stiff and accordingly have a tendency to remain in and return to a normal flat condition. To facilitate the application of such labels, the latter are first sprayed on one surface with a suitable moistening fluid, and then are moistened on the opposite surface by the application of a coating of adhesive thereto, and subsequently are moistened again coincidentally with the initial application of said labels to the bottles A or other articles; in other words, the labels are moistened to a maximum degree in a comparatively short operative period and thereby are rendered capable of being efficiently applied to the bottles A or other articles, regardless of any inherent stiffness or the like present in the labels 17 in their normal condition. The final step in the application of said labels is carried out in the presence of heat whereby the moisture is removed from said labels and the adhesive coatings thereof are quickly set and brought to maximum efficiency in a minimum of time. While the machine may be used for applying labels of any type, it is particularly designed to efficiently and uniformly apply labels of the aforesaid type. The machine requires no particularly skilled supervision and is rapid and accurate in operation regardless of the type of labels being applied, or the character of the articles to which application is made.

Various changes in the specific forms shown and described may be made within the scope of the claims without departing from the spirit of the invention.

I claim:

1. In a labeling machine, the combination of means for supporting articles in label receiving position, means for removing labels from a supply thereof and applying said labels to said articles, and means whereby said labels are moistened prior to the removal thereof from said supply.

2. In a labeling machine, the combination of a container for a supply stack of labels, means for supporting articles in label receiving position, means for removing labels from said supply stack in individual succession and applying said labels to said articles, and means whereby one surface of said labels is moistened prior to the removal thereof from said stack.

3. In a labeling machine, the combination of a container for a supply stack of labels, means for supporting articles in label receiving position, a pick-up device for removing labels from said supply stack in individual succession and transferring said labels into applying relation to said articles, means operatively associated with said pick-up device for moistening said labels coincidentally with the removal thereof from said stack, and means for applying said labels to said articles.

4. In a labeling machine, the combination of a container for a supply stack of labels, means for supporting articles in label receiving position, a pick-up device for removing labels from said supply stack in individual succession and transferring said labels into applying relation to said articles, means operatively associated with said pick-up device whereby one surface of said labels is moistened prior to the removal thereof from said stack, means whereby a coating of adhesive is applied to the opposite surface of said labels, and means for applying said labels to said articles.

5. In a labeling machine, the combination of a container for a supply stack of labels, means for supporting articles in label receiving position, a pick-up device for removing labels from said supply stack in individual succession and transferring said labels into applying relation to said articles, means operatively associated with said pick-up device whereby one surface of said labels is moistened prior to the removal thereof from said stack, means located in the path of transfer of said label for applying a coating of adhesive to the opposite surface of said labels, and means for applying said labels to said articles.

6. In a labeling machine, the combination of a container for a supply stack of labels, means for supporting articles in label receiving position, a pick-up device for removing labels from said supply stack in individual succession and transferring said labels into applying relation to said articles, means operatively associated with said pick-up device whereby one surface of said labels is moistened prior to the removal thereof from said stack, means located in the path of transfer of said label for applying a coating of adhesive to the opposite surface of said labels, and means for applying said labels to said articles and for coincidentally moistening said labels during such application.

7. In a labeling machine, the combination of a container for a supply stack of labels, means for supporting articles in label receiving position, a pick-up device for removing labels from said supply stack in individual succession and transferring said labels into applying relation to said articles, means operatively associated with said pick-up device whereby one surface of said labels is moistened prior to the removal thereof from said stack, means located in the path of transfer of said label for applying a coating of adhesive to the opposite surface of said labels, and means including moist pressure pads whereby said labels are applied to said articles and coincidentally moistened during such application.

8. In a labeling machine, the combination of a container for a supply stack of labels, means for supporting articles in label receiving position, a pick-up device for removing labels from said supply stack in individual succession and transferring said labels into applying relation to said articles, means operatively associated with said pick-up device whereby one surface of said labels is moistened prior to the removal thereof from said stack, means located in the path of transfer of said label for applying a coating of adhesive to the opposite surface of said labels, means for initially applying said labels to said articles and for coincidentally moistening said labels during such initial application, and means for subsequently pressing said labels against said articles in the presence of heat whereby moisture is removed from said labels and the application thereof is completed.

9. In a labeling machine, the combination of a container for a supply stack of labels, means for supporting articles in label receiving position, a pick-up device for removing labels from said supply stack in individual succession and transferring said labels into applying relation to said articles, means operatively associated with said pick-up device whereby one surface of said labels is moistened prior to the removal thereof from said stack, means located in the path of transfer of said label for applying a coating of adhesive to the opposite surface of said labels, means for initially applying said labels to said articles and for coincidentally moistening said labels during such initial application, and means including heated pressure pads for subsequently pressing said labels against said articles whereby moisture is removed from said labels and the application thereof is completed.

10. In a labeling machine, the combination of means for supporting articles in label receiving position, a pick-up device for removing labels from a supply stack thereof in individual succession and transferring said labels into applying relation to said articles, said labels having adhesive coatings at the application stage thereof, means for moistening said labels with non-adhesive moisture, and heated applying means including at least one heated pressure member whereby said adhesive coated and moistened labels are pressed against said articles and coincidentally heated to remove the non-adhesive moisture from said labels and to adhesively apply the same to said articles.

11. In a labeling machine, a support for articles to be labeled, means for applying adhesive coated labels in initial adhesive contact with said articles and for coincidentally moistening said labels, and heated means for subsequently pressing said initially applied labels against said articles and coincidentally heating the labels to remove the moisture therefrom and to convert said initial adhesive contact into an adhesive bond to complete the application of said labels.

12. In a labeling machine, a support for articles to be labeled, means for initially applying adhesive coated labels to said articles and for coincidentally moistening said labels, and means including heated pads for subsequently pressing said initially applied labels against said articles to cause the moisture to be removed from said labels and to complete the application thereof.

13. In a labeling machine, the combination of movable means for advancing articles over a predetermined path, means for removing labels from a supply thereof and initially applying said labels to said articles, means for moistening said labels coincidentally with the initial application thereof to said articles, and means for exerting a final applying pressure on said labels and for coincidentally causing the moisture to be removed therefrom whereby the initial application of said labels is converted into a permanent bond to complete the application of said labels to the articles.

14. In a labeling machine, the combination of an intermittently movable support for transferring articles in successive steps over a predetermined path, means for removing labels from a supply stack thereof in individual succession and transferring said labels into applying relation to said articles at one point of said path, means whereby one surface of said labels is moistened coincidentally with the removal thereof from said stack, means for applying a coating of adhesive to the other surface of said labels during said transfer, means operative at said one point of said path for initially applying said labels to said articles and for coincidentally moistening said labels, and means operative at a subsequent point of said path for exerting a final applying pressure on said initially applied labels and for coincidentally heating the same to cause the moisture to be removed from said labels and for completing the application thereof.

15. In a labeling machine, the combination of an intermittently operated support movable over a given path including successive label applying stations, means on said support for maintaining articles in label receiving position thereon, label supporting means at the first of said stations, means for depositing adhesive coated labels on said label supporting means in label applying relation to said articles thereat, applying means operative at said first station for removing the deposited labels from said supporting means and initially applying said labels to said articles and for coincidentally moistening said labels, and heated means operative at a subsequent applying station for exerting a pressure on said initially applied labels and for coincidentally heating the same to cause the moisture to be removed from said labels and complete the application thereof.

16. In a labeling machine, the combination of a support for an article to be labeled, and means for adhesively applying a label to said article, said means comprising a pressure device, a pair of pressure levers, pressure pads carried by said pressure levers, means for concurrently moving said pressure device and pressure levers toward said article to cause said pressure device to initially press a predetermined portion of said label into adhesive engagement with said article, and to subsequently move the pressure levers and the pressure pads thereof into operative relation to said article, means for operating said pressure levers to cause the pressure pads to adhesively apply additional portions of said label to said article, and means for moistening said pressure pads whereby said additional portions of said label are moistened coincidentally with the application thereof to said article.

17. In a labeling machine, the combination of a support for an article to be labeled, means for adhesively applying a label to said article, said means comprising a pressure device, a pair of pressure levers, pressure pads carried by said pressure levers, means for concurrently moving said pressure device and pressure levers toward said article to cause said pressure device to initially press a predetermined portion of said label into adhesive engagement with said article, and to subsequently move the pressure levers and the pressure pads thereof into operative relation to said article, means for operating said pressure levers to cause the pressure pads to adhesively apply additional portions of said label to said article, and means for moistening said pressure pads whereby said additional portions of said label are moistened coincidentally with the application thereof to said article, and heated means for subsequently exerting pressure against said applied additional portions of said label to cause the moisture to be removed therefrom and to coincidentally complete the application thereof.

18. In a labeling machine, the combination of means for supporting a bottle in an upright label receiving position, means for supporting an adhesive coated label above and in symmetrical relation to the upper end of said bottle, a fixed guideway, a slide member vertically movable in said guideway, a guide bracket on said slide member movable therewith, a pressure slide slidably mounted in said guide bracket in surface engagement with said slide member, a pressure device carried by said pressure slide, a spring having its one end connected with said guide bracket and its other end secured to said pressure slide, a pair of rocking pressure levers pivoted on said guide bracket, pressure pads carried by said pressure levers, means for moistening said pressure pads, means for moving said slide member in said fixed guideway whereby said pressure slide is correspondingly moved to cause its pressure device to press an intermediate portion of said label into adhesive engagement with the top of said bottle and for continuing the movement of said slide member and pressure members independently of said pressure slide to fold the opposite end portions of said label along the neck of said bottle at opposite sides thereof and shift the pressure pads of said pressure members into corresponding operative relation to said bottle neck and to coincidentally place said spring under tension whereby said pressure device developes an applying pressure on said intermediate portion of said label, a pair of operating levers in operative connection with said pressure members at the termination of said independent movement of said slide members, and means for actuating said operating levers to operate said pressure levers and to cause the pressure pads thereof to adhesively apply the opposite end portions of said label to said bottle neck and to coincidentally moisten said opposite end portions of the label whereby any tendency thereof to spring away from said bottle neck is neutralized.

19. In a labeling machine, the combination of a support intermittently movable over a predetermined path, means on said support for maintaining a bottle in upright label receiving position thereon, means operative at one point in said path for adhesively applying an intermediate portion of said label to the upper end of said bottle and for folding opposite end portions of said label into adhesive contact with the neck of said bottle and for coincidentally moistening said opposite end portions of the label whereby any tendency of said folded end portions to spring away from said bottle neck is neutralized, and additional means operative at a subsequent point in said predetermined path, said additional means comprising pivoted operating levers, a slide member, pressure levers pivotally mounted on said slide member, heated pressure pads carried by said pressure levers, means for moving said slide member and pressure levers relatively to said operating levers to shift said heated pressure pads into operative relation to said bottle neck, means operative at the terminus of said relative movement of said slide member for operatively coupling said pressure levers and operating levers together, and means for actuating said operating levers to operate said pressure levers in a manner to cause said pressure pads to heat said applied opposite end portions of said label to cause the moisture to be removed therefrom and to coincidentally exert pressure thereon whereby the adhesive application of said end portions of the label to said bottle neck is completed.

20. In a labeling machine, means for supporting a bottle in an upright label receiving position, means for moistening one surface of said label to soften the same, means for applying a coating of adhesive to the opposite surface of said label to further soften the same, means for applying an intermediate portion of said label to the upper end of said bottle, means for folding the opposite end portions of said label downwardly along the neck of said bottle into adhesive contact therewith and for coincidentally moistening said end portions of the label to still further soften the same, and heated means for pressing said end portions of the label against the neck of said bottle and for coincidentally heating said end portions to cause the moisture to be removed thereupon and to complete the application of said label to said bottle.

21. In a labeling machine, means for supporting a supply stack of labels and for periodically restoring the upper end of said stack to a predetermined level, a feeler periodically contacting with the upper end of said stack to control the periodic restoration thereof, and means associated with said feeler whereby successive terminal labels in said stack are moistened.

22. In a labeling machine, means for supporting a supply stack of labels and for periodically restoring the upper end of said stack to a predetermined level, a feeler vertically movable toward and away from the upper end of the stack to control the periodic restoration thereof, a spraying device carried by said feeler, a connection from said spraying device to a source of moistening liquid, and a valve in said connection controlled by said feeler whereby successive terminal labels in said stack are sprayed to moisten the same.

23. In a labeling machine, a turntable constituting a support for articles to be labeled, means for intermittently actuating said turntable to transfer said articles in successive steps over a given path, a supply of labels, a vacuum type pick-up means for removing successive labels from said supply and for transferring the picked up labels to a predetermined point in said path for application to said articles, a suction connection leading to said pick-up means, a valve in said connection, means including a linearly operated tripping member for controlling said valve, index means including an index member located at another predetermined point in said path controlled in its operation by the presence or absence of an article on said turntable, and a control member movable by said index means into the path of said tripping member to arrest its operative control of said valve if no article is present on said turntable.

24. The method of applying relatively stiff labels which consists in moistening one surface of the label to soften the same, applying a coating of adhesive to the opposite surface of said label to make the same adhesive and to further soften said label, adhesively applying said label to an article and coincidentally moistening said label to still further soften the same, and applying heated pressure to said applied label to cause the moisture to be removed therefrom and to complete the application of said label.

25. The method of applying relatively stiff labels which consists in moistening an adhesive coated label and coincidentally applying the same adhesively to an article, and then applying heated pressure to said applied label to cause the moisture to be removed therefrom and to complete the application of said label.

26. The method of applying labels which consists in subjecting a label to successive moistenings, one of said moistenings being effected by applying a coating of adhesive to one surface of said label, and the final moistening being effected coincidentally with an application of said label to an article.

27. The method of applying labels which consists in subjecting a label to successive moistenings, one of said moistenings being effected by applying a coating of adhesive to one surface of said label, and the final moistening being effected coincidentally with an application of said label to an article and subsequently to the final moistening of said label applying pressure to said applied label in the presence of heat to cause the moisture to be removed therefrom and to complete the application of said label to the article.

28. In a labeling machine, the combination of an intermittently operated support for articles to be labeled, movable label supporting means arranged to occupy an operative position in the path of an article on said support, means for depositing an adhesive coated label in temporary adhesive contact with said label supporting means while the latter is in said operative position whereby said label is held in applying relation to said article, means for detaching said label from said label supporting means and applying it to said article, and means for moving said label supporting means into said operative position prior to the deposit of a label thereon, and out of the path of the labeled article prior to an intermittent advance of said article support.

29. In a labeling machine, the combination of means for supporting a bottle in an upright label receiving position, means for supporting an adhesive coated label above and in symmetrical relation to the upper end of said bottle, a fixed guideway, a slide member vertically movable in said guideway, a guide bracket on said slide member movable therewith, a pressure slide slidably mounted in said guide bracket in surface engagement with said slide member, a pressure device carried by said pressure slide, a spring having its one end connected with said guide bracket and its other end secured to said pressure slide, a pair of rocking pressure levers pivoted on said guide bracket, pressure pads carried by said pressure levers, means for moving said slide member in said fixed guideway whereby said pressure slide is correspondingly moved to cause its pressure device to press an intermediate portion of said label into adhesive engagement with the top of said bottle and for continuing the movement of said slide member and pressure members independently of said pressure slide to fold the opposite end portions of said label along the neck of said bottle at opposite sides thereof and shift the pressure pads of said pressure members into corresponding operative relation to said bottle neck and to coincidentally place said spring under tension whereby said pressure device develops an applying pressure on said intermediate portion of said label, a pair of operating levers in operative connection with said pressure members at the termination of said independent movement of said slide members, and means for actuating said operating levers to operate said pressure levers and to cause the pressure pads thereof to adhesively apply the opposite end portions of said label to said bottle neck.

30. In a labeling machine, the combination of means for supporting articles in label receiving position, and moistened pressure means for simultaneously moistening and pressing the labels to apply the same to said articles.

31. In a labeling machine, the combination of means for supporting articles in label receiving position, pressure means for adhesively applying labels to said articles, and means for supplying moisture to said pressure means whereby said labels are moistened coincidentally with the application of applying pressure thereto.

32. In a labeling machine, the combination of means for supporting articles in label receiving position, means for moistening a surface of the relatively stiff labels to soften the same, means for applying a coating of adhesive to the opposite surfaces of said labels to make the same adhesive and to further soften said labels, and moistened pressure means for adhesively applying the labels to said articles and coincidentally moistening the same to still further soften said labels to thereby neutralize the inherent stiffness thereof until efficient adhesive bonds between the articles and labels have been developed.

33. In a labeling machine, a support for articles to be labeled, a vacuum type pick-up means for transferring labels for application to said articles, a suction connection leading to said pick-up means, a valve in said connection, means including a tripping member for controlling said valve, index means including an index member controlled in its operation by the presence or absence of an article on said support, and a control member operatively connected with said index means and movable thereby into the path of said tripping member to arrest its operative control of said valve if no article is present on said support.

34. In a labeling machine, the combination of label supporting means, a suction head for carrying labels from a supply thereof and for releasably depositing said labels on said label supporting means, a rotary table for conveying articles to be labeled into label receiving relation to the labels on said supporting means, means for applying adhesive to a surface of said labels and for applying non-adhesive moisture to the opposite surface thereof, and means for depositing said labels on said articles subsequent to the release of said labels from said supporting means and subsequent to the application of adhesive and non-adhesive moisture to said labels.

35. In a labeling machine, the combination of means for applying labels to articles, and means for providing opposite faces of said labels with applications of different fluids prior to the deposit of said labels on said articles.

36. The combination of label applying mechanism including a horizontally reciprocable carrier for transporting labels to a labeling station, a turntable rotatable about a vertical axis for supporting articles to be labeled and for transporting said articles to said labeling station, and two spaced parallel horizontal shafts operatively connected with each other and with said label applying mechanism and turntable for operating the same in predetermined synchronism to effect the application of the labels to the articles.

37. In a labeling machine, the combination of means for supporting an article in upright label receiving position, supporting means including spaced members for releasably receiving the opposite ends of a label to support the latter in applying relation to the upper end of said article, means operative on an intermediate portion of said label for pressing said intermediate portion of the label into engagement with the upper end of said article with the opposite end portions of said label in unattached relation to said article and for maintaining said label against shifting on said article, a slide, co-operating pressure members pivotally mounted on said slide and movable therewith into operative relation with said article, said pressure members folding the unattached end portions of said label downwardly along said article subsequent to the release of said end portions of said label from the spaced members of said supporting means, and means for pivotally actuating said pressure members to press said end portions of the label into engagement with said article whereby the application of the label thereto is completed.

38. In a labeling machine, the combination of means for supporting articles in label receiving position, means for moistening a surface of relatively stiff labels to soften the same, means for applying adhesive to the opposite surfaces of said labels to make the same adhesive and to further soften the labels, and pressure means for adhesively applying the labels to said articles.

39. In a labeling machine, means for transporting articles over a given path, a supply of labels, a vacuum type pick-up means for feeding successive labels from said supply, a suction connection leading to said pick-up means, a valve in said connection, means including a linearly operated tripping member for controlling said valve, index means including an index member located at a predetermined point in said path controlled in its operation by the presence or absence of an article at said predetermined point in said path, and a control member movable by said index means into the path of said tripping member to arrest its operative control of said valve if no article is present at said predetermined point in said path.

40. In a labeling machine, the combination of movable means for advancing articles over a predetermined path, means for removing labels from a supply thereof, means to apply an adhesive coating to said labels, means to support said labels in applying relation to said articles, means to moisten the side of said label opposite the adhesive coated side thereof prior to presenting said label in applying relation to said article and means to apply the label to said article.

GEORGE W. von HOFE.